O. E. HOVEY.
DERRICK.
APPLICATION FILED OCT. 14, 1919.
1,369,107.
Patented Feb. 22, 1921.
7 SHEETS—SHEET 7.
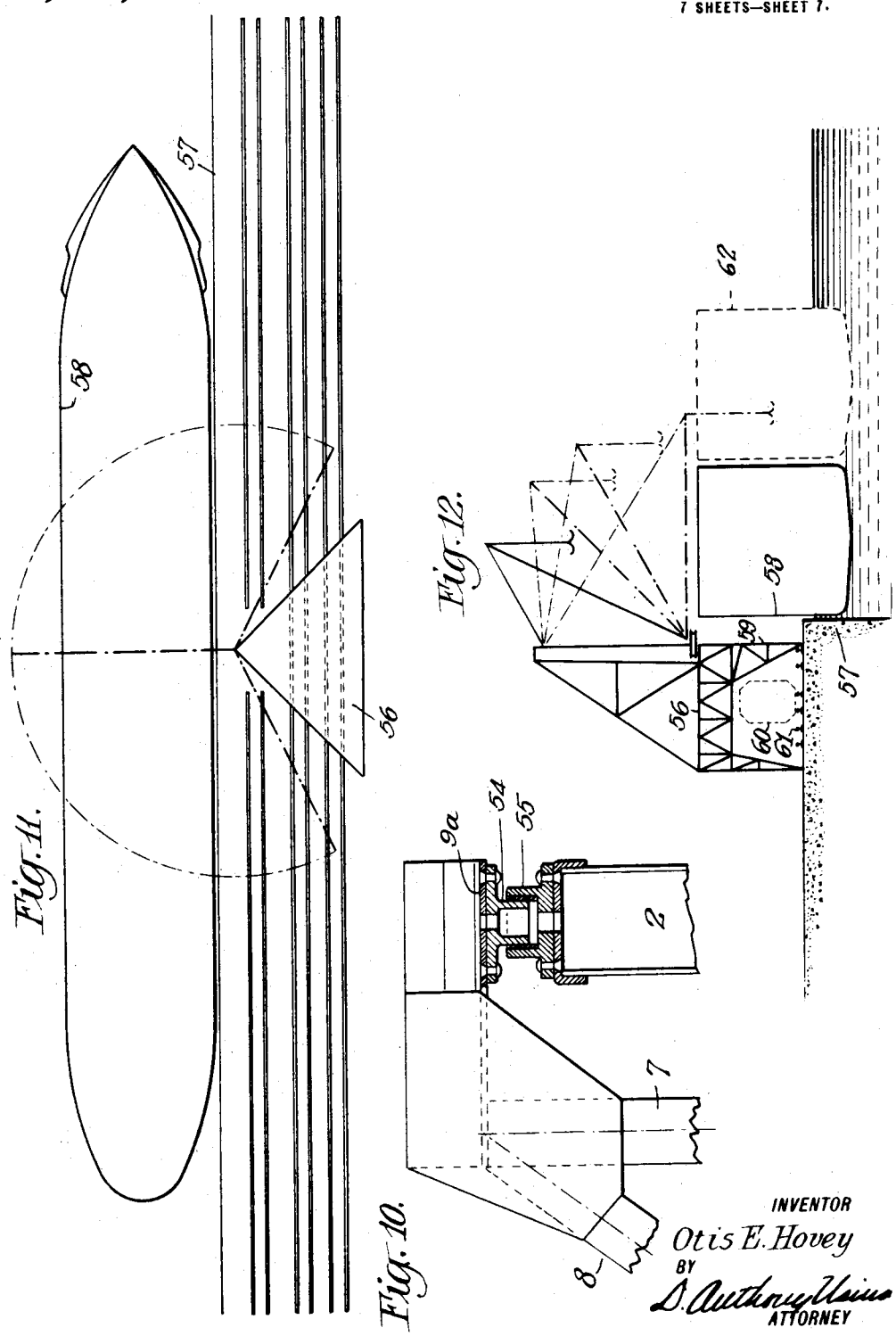
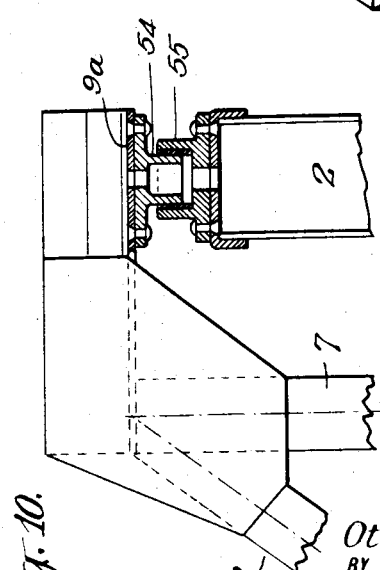
INVENTOR
Otis E. Hovey
BY
D. Anthony Usina
ATTORNEY

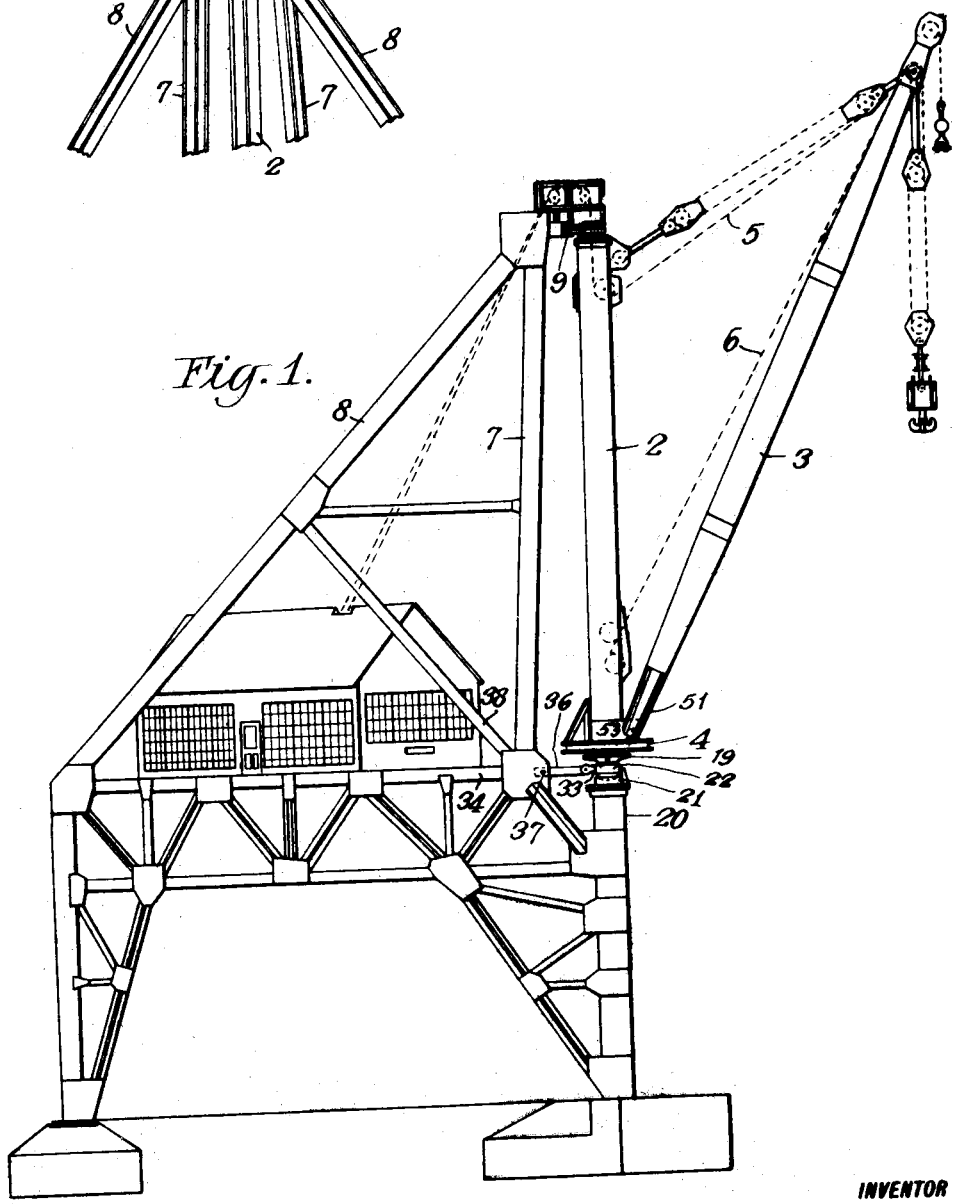

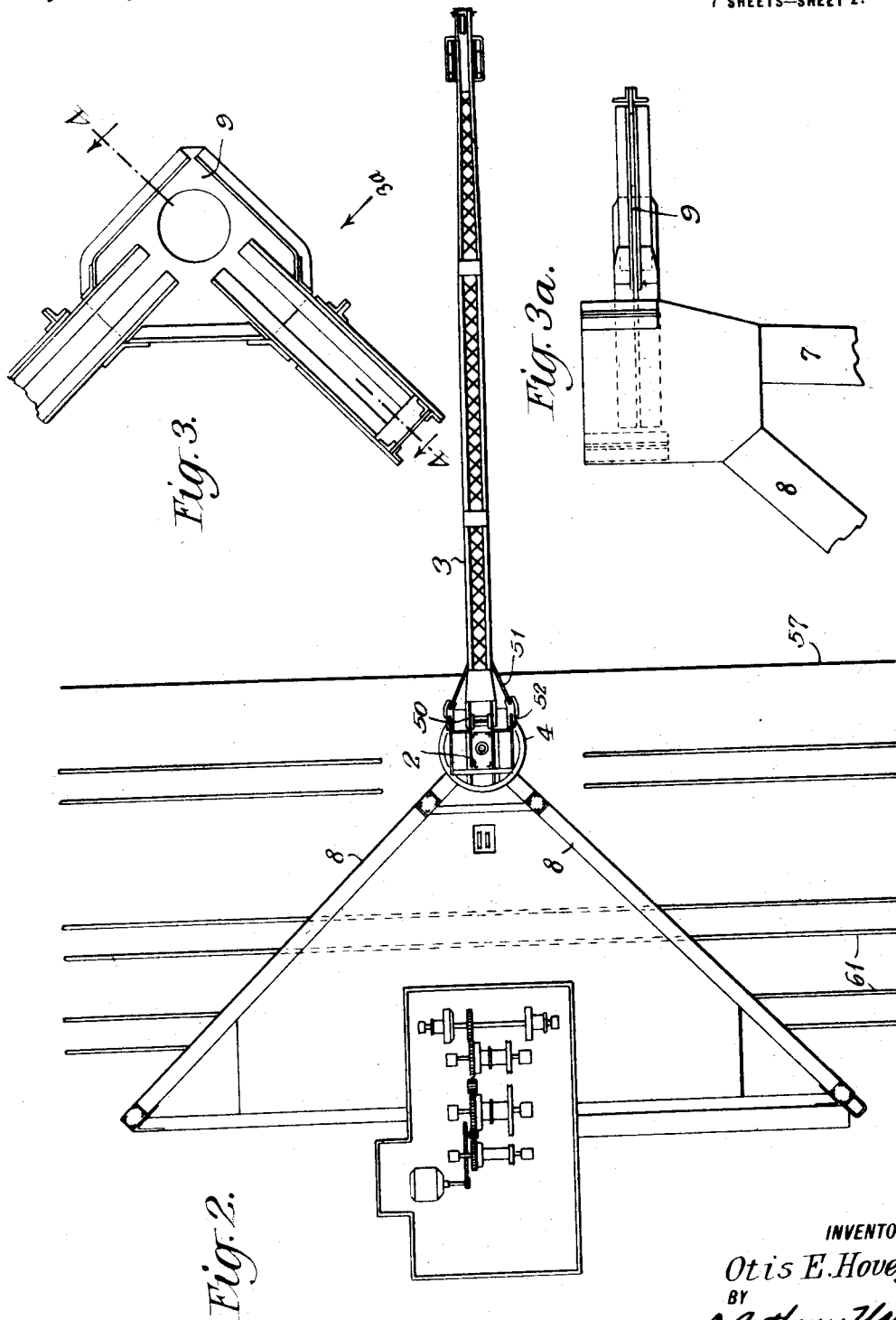

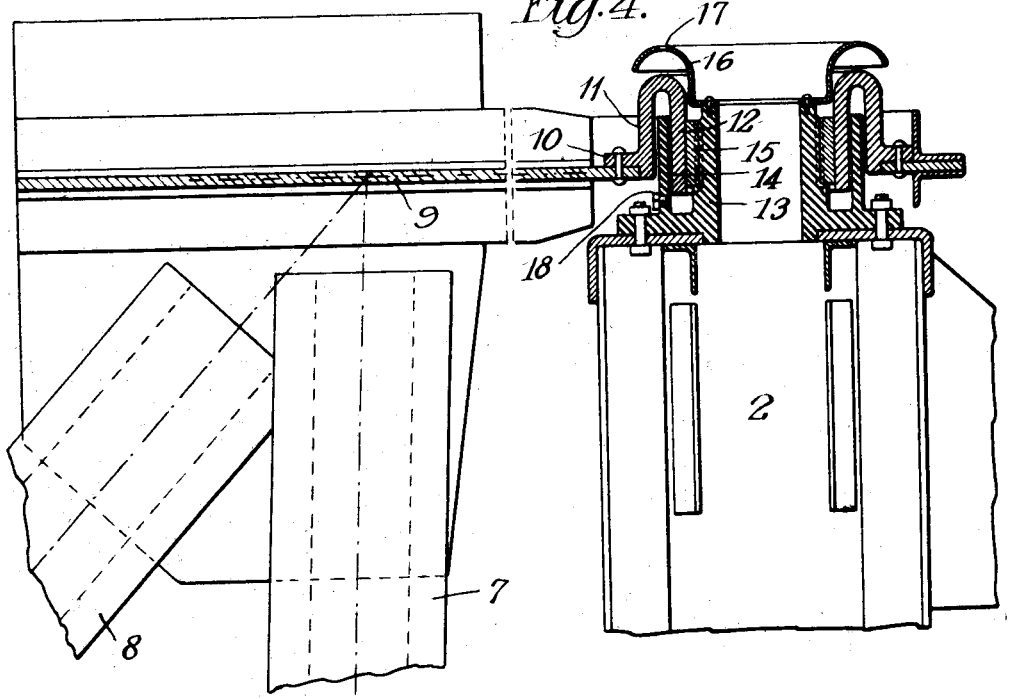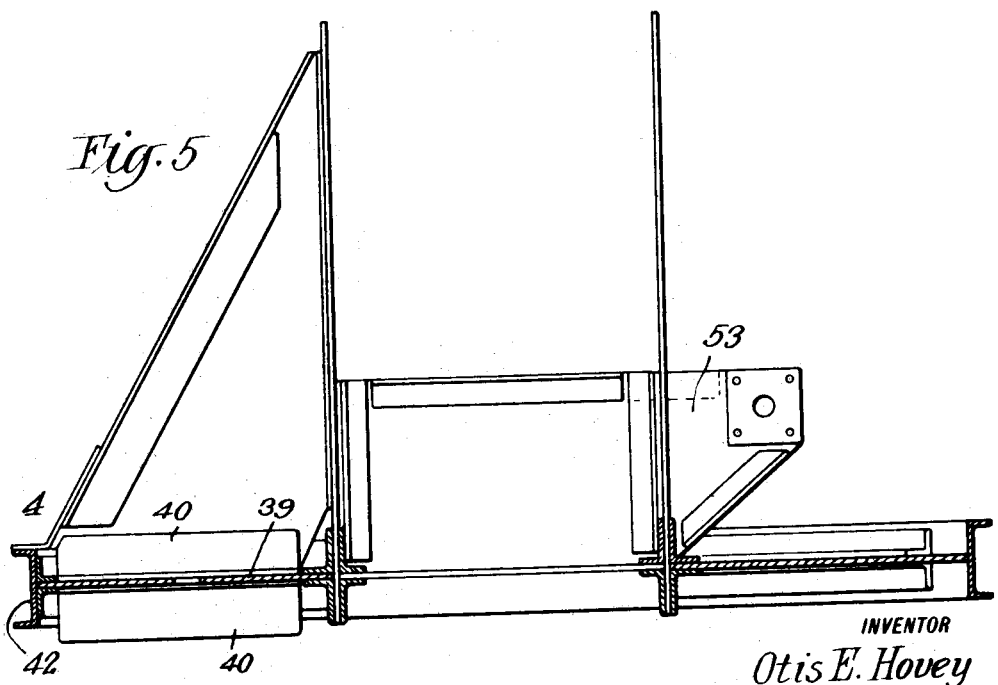

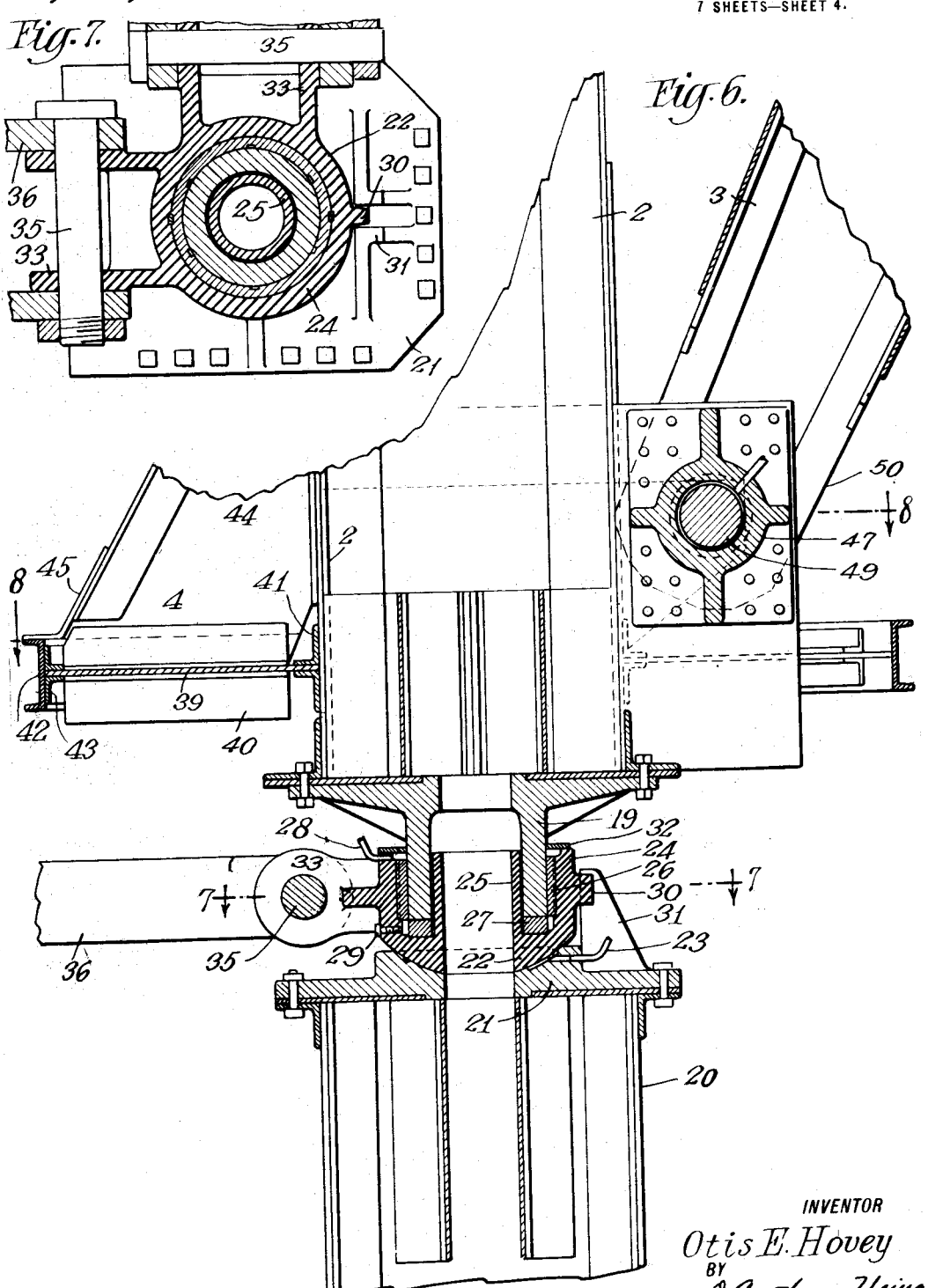

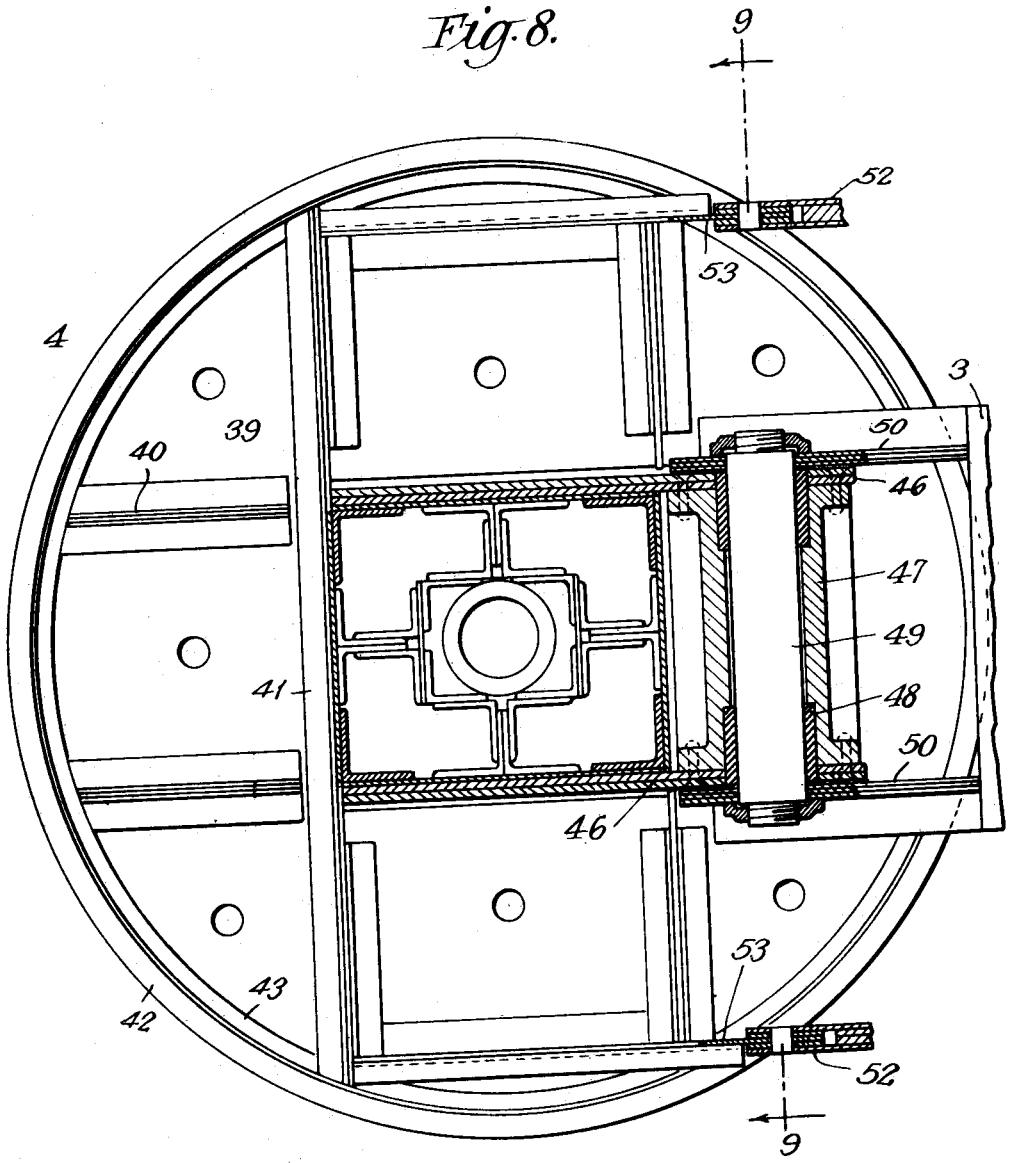

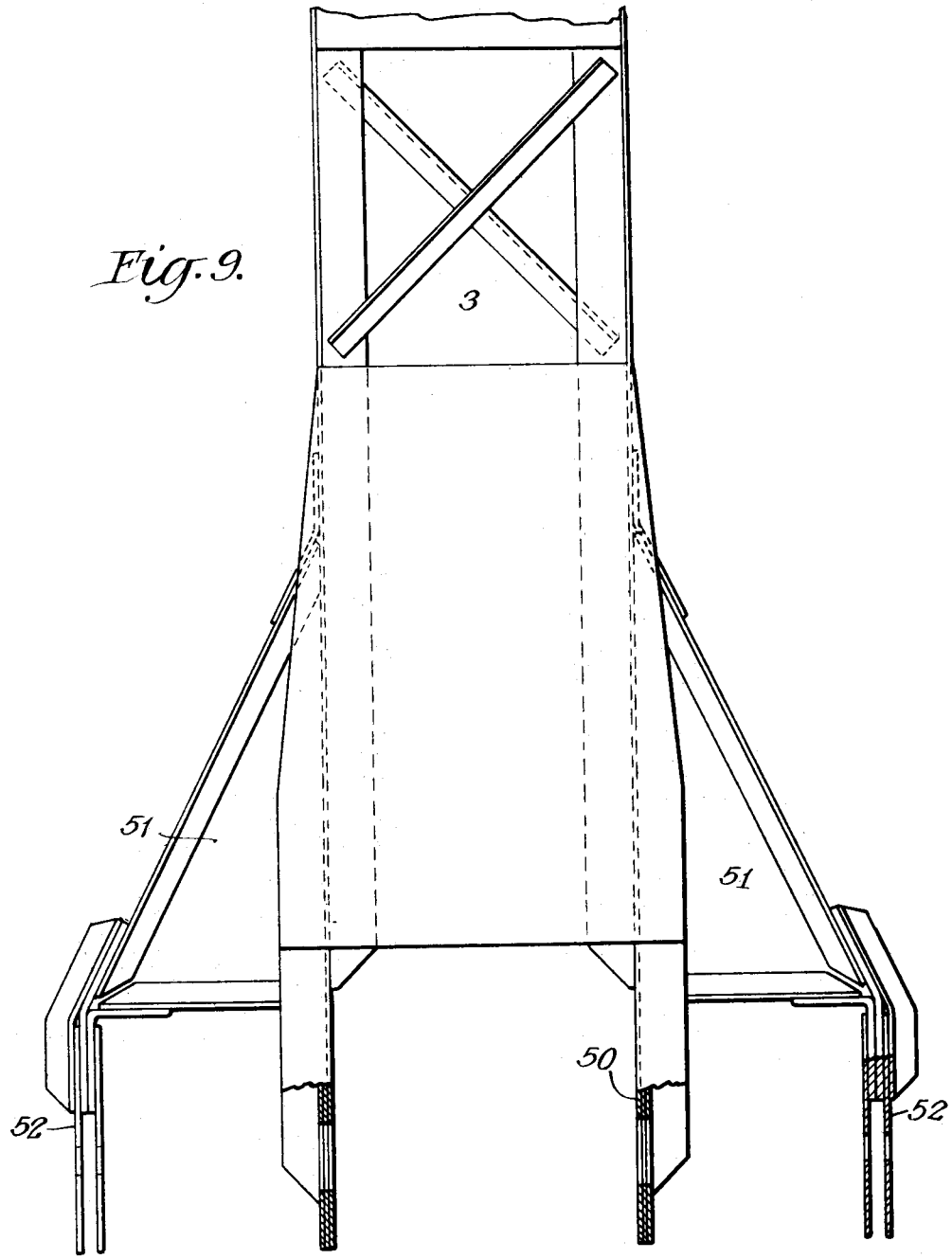

UNITED STATES PATENT OFFICE.

OTIS E. HOVEY, OF NEW YORK, N. Y.

DERRICK.

1,369,107.	Specification of Letters Patent.	Patented Feb. 22, 1921.

Application filed October 14, 1919. Serial No. 330,581.

*To all whom it may concern:*

Be it known that I, OTIS E. HOVEY, a citizen of the United States, residing in the city, county, and State of New York, and whose post-office address is No. 431 Riverside Drive, New York city, New York, have invented certain new and useful Improvements in Derricks, of which the following is a specification.

My invention provides certain improvements in derricks whereby I provide a better arrangement of the parts for taking the strains of use and for certain other advantageous features hereinafter described and referred to in detail.

The accompanying drawings illustrate certain embodiments of the invention.

Figure 1 is a side elevation of a derrick;

Fig. 1ᵃ is a rear elevation of the upper end of the derrick of Fig. 1;

Fig. 2 is a plan of the derrick;

Fig. 3 is an enlarged plan of a detail at the upper end of the mast;

Fig. 3ᵃ is a side elevation of the same;

Fig. 4 is a section along the line 4—4 of Fig. 3 on a further enlarged scale;

Fig. 5 is a vertical section of the bull-wheel at the lower end of the mast;

Fig. 6 is a similar sectional view of the lower end of the mast with its bearing and other connected parts;

Figs. 7 and 8 are horizontal sections on the correspondingly numbered lines of Fig. 6;

Fig. 9 is a vertical section on the line 9—9 of Fig. 8;

Fig. 10 is a view similar to Fig. 4 illustrating a modified construction;

Figs. 11 and 12 are respectively a diagrammatic plan and elevation showing the application of the derrick to a shipyard.

The improvements are shown in connection with derricks of the stiff-leg variety. The mast 2 and boom 3 are pivoted together at their lower ends, the mast being mounted in bearings so that it can be rotated by means of a bull-wheel 4 on its lower end. The boom is raised and lowered by means of a cable 5 extending from the upper end of the mast to the upper end of the boom and known as the boom fall or topping lift. The cable 6 or main hoist, as it is called, raises and lowers the load. Connected to the supports at opposite ends of the mast is a pair of trusses extending backward at a wide angle to each other. Each of these trusses comprises a post 7 and a back-leg 8, meeting at a point near the upper end of the mast and extending down to the floor or platform of the structure.

In use there are vertical strains on the mast, usually compression but becoming tension when the derrick is turned into certain positions or the boom is topped high. The horizontal and vertical strains or components of the strain at the top of the mast have usually been taken by a bent member known as a goose-neck connecting the top of the mast with the stiff-leg and this construction has produced bending stresses in the goose-neck and also in the stiff-leg which required that they be of considerable strength and weight, greater than would be required if there were no bending stresses. In fact these parts, particularly the goose-neck, have sometimes been bent, which makes the operation of the derrick difficult, and in some cases have broken, allowing the derrick to fall and resulting in serious injury to men as well as loss of material. Also, in certain positions of the mast, the strain tends to cause the lifting of the upper end of the stiff-leg and its goose-neck and a special detail has been needed to anchor the latter down. This has usually been accomplished by a cap above the goose-neck and attached to the gudgeon pin at the upper end of the mast; a construction which prevented good lubrication, the oil applied to the bearing running out at the bottom. I avoid this disadvantage by a construction which is simpler, in which the parts are subjected only to longitudinal stresses, that is tension or compression but no bending, and in which consequently a lighter construction can be used without danger of failure, and in which the lubrication is improved.

Connected to the upper ends of the members 7 and 8 and located in the plane of the intersection thereof (see Fig. 1ᵃ) is a horizontal member 9 which extends over the upper end of the mast and carries a ring-shaped bearing in which the end of the mast turns. The details of the bearing are shown in Fig. 4. This ring-shaped member comprises a casting having a flange 10 by which it is attatched to the plate or member 9, an upwardly projecting ring 11 and a downwardly projecting ring 12. On the upper end of the mast 2 is mounted a bearing member having a central ring 13, and an outer ring 14, these two rings embracing the ring 12 of the first mentioned bearing. Mounted on the outer face of the ring 13 is a ring 15 of bronze or other bearing metal against which the outer bearing ring 12 rests. A sheet metal cap 16 mounted on the ring 13 covers the bearing and is provided with holes 17 through which oil may be introduced between the rings 12 and 13, where it will be retained by the ring 14 until let out by removal of the drain plug 18. This bearing, allowing freedom of vertical movement to the upper end of the mast, will transmit to the connecting member 9 only the horizontal components of the stresses occurring at this point. That is to say, the member 9 will be subjected to tensile or compressive stresses only. And since the horizontal center line of its member intersects the centers of the members 7 and 8, as indicated in dotted lines, there will be no bending strains transmitted to the parts of the back-leg and these can be proportioned of comparatively small cross-section.

Various other styles of bearing may be used instead of that shown. The center hole in the bearing is for the downward passage of the topping lift cables. The center of pressure of the bearing ring should, for perfection, be in line with the center of the horizontal connecting plate 9.

My invention provides also an improvement in the step or bearing at the base of the mast. In previous designs there have been large bending stresses introduced into the supporting sill by the eccentric action of the horizontal forces at this point and also there have been considerable local stresses in the details, and lubrication has been imperfect.

I mount on the lower end of the mast a casting 19 having a ring-shaped portion. On the sill or supporting structure, indicated at 20, there is rigidly mounted a casting 21. The upper surface of this casting is in the form of a concave segment of a sphere in which rests a casting 22 with its lower face similarly convexed. Lubrication is provided for by the usual grooves in the lower member communicating with an oil pipe 23. The casting 22 has outer and inner rings 24 and 25 respectively embracing the ring portion of the casting 19, and bronze or other bearing metal rings 26 and 27 receive the horizontal strain and the vertical thrust respectively. Other styles of rotary and thrust bearings may be substituted for those shown. All the parts are provided with central holes for the passage of the main hoist cables. A guard 32 serves to exclude dirt and water. Oil is admitted through a pipe 28 and is held between the rings 24 and 25 until emptied through a plug 29.

The member 22 is also provided with a lug 30 at one side which fits freely between a pair of lugs 31 on the lowest member so as to permit the member 22 to rock freely on the casting 21 without turning about a vertical axis, the clearance between the lugs being sufficient to permit the upper member 22 to have a slight movement in vertical planes. The member 22 is provided at the opposite side with pairs of lugs 33 extending in the direction of the planes of the stiff-legs or sill members 34 (Fig. 1), these lugs having pin holes, the centers of which are horizontally in line with the center of the rotary bearing bushing 26. Each pair of lugs 33 is connected by a pin 35 with a link 36 and these links at their opposite ends are fastened by pins 37, Fig. 1, to the center lines of the sill members 34.

The vertical components of the stresses received at the lower end of the mast are delivered through the anti-friction bearing member 27 to the member 22 and thence to the lowest member 21 which is supported by the member 20 which rests on the foundations carrying the derrick. When the mast deflects a slight rocking movement occurs between the lower two members 22 and 21 so that the load is always delivered uniformly to the bearing bushing 27. Horizontal forces developed at the foot of the mast are delivered through the member 19 to the bushing 26 and to the casting 22 and thence through the links 36 to the sills of the platform without bending stresses, except the slight bending stresses in the casting constituting the bearings, for which they are fully proportioned.

My invention provides also a new design and arrangement of the bull-wheel by which the mast is rotated. This is a grooved wheel to the rim of which operating ropes are attached by which it can be turned in one direction or the other. The bull-wheel, designated as a whole by the numeral 4, comprises a heavy plate 39 stiffened by angles 40 and riveted through angles 41 to the mast 2. The rim 42 is formed of a channel bent around the edge of the circular plate 39 and riveted thereto by means of angles 43. Outrigger gusset plates 44 are also fastened to the mast along their vertical edges and to the plate 39 and to plates 45 connected to the rim of the bull-wheel. These gusset plates extend well up to the base of the mast and the whole construction is strong and stiff to withstand strains in all directions.

I provide also an improved connection of the lower end of the boom to the mast. Jaw plates 46, Fig. 8, are riveted to the mast and to the bull-wheel attachments and extend out to one side of the mast. Between their extended portions is riveted a tubular casting 47 with bushings 48 at its ends within which is located a pin 49 on the projecting ends of which are fastened the side plates 50 of the boom 3. When the boom is carrying a load and the derrick is rotated by the bull-wheel mechanism, heavy bending strains are caused in the lower end of the boom and the distribution of stresses to the boom pin is seriously disturbed, frequently more than doubling the compressive strains on one end of the pin and one jaw plate and neutralizing the normal compression at the other end of the pin or even causing a heavy tensional stress upon it.

I provide against this defect in part by locating the jaw plates 50 of the boom outside of the plates 46 of the mast so as to secure as wide a bearing as possible. The bearing also is provided with suitable lubrication. In addition I provide auxiliary bearings widely separated and in line with the boom pin 49. For this purpose heavy outrigger gussets 51, Fig. 9, are attached to each side of the lower end of the boom and carry depending jaw plates 52, Figs. 8 and 9. Fastened to the bull-wheel at opposite sides and extending upward therefrom are out-rigger bearings 53 the center line of bearing of the jaw plates 52 being in line with that of the main boom pin 49. The base to resist stresses due to rotation of the derrick is thus increased from the width of the mast to the distance between the outriggers. In the case illustrated this is nearly a three fold increase, and it may be made greater if desired.

A modification of the design for the upper end of the mast is shown in Fig. 10. In this case the connecting plate 9ª by which the stiff-leg members 7 and 8 are connected to the mast 2 is located above the center of lateral pressure of the bearing between the members 54 and 55. The bearing is arranged to permit freedom for vertical movement between the parts. But the line of the horizontal stress is somewhat below the plane of the connecting member 9ª. Thus there will be a slight bending strain proportioned to the distance between the center of pressure of the bearing and the center of the connecting member 9ª. But, this member being designed to withstand the bending strains will transmit practically only longitudinal strains to the members 7 and 8 of the stiff-leg which intersect each other in substantially the center of the member 9ª.

This derrick is particularly adapted for use in ship building yards, dry docks and the like, and I have shown it mounted for convenient operation in such work. See Figs. 11 and 12. In this case the supporting structure indicated as a whole at 56 is triangular in plan with one corner near the front of the wet basin wall 57 and the rear side parallel thereto. The supporting structure is made high enough to allow the derrick boom to swing above the deck of a vessel 58 in the basin, the derrick proper being mounted over the center of the front corner post 59. Also the floor trusses of the supporting structure are arranged at such a height as to allow the passage of supply cars 60 on tracks 61 running under the structure. The boom is made large enough to reach across the vessel 58 to another vessel or barge 62 beyond the first, so that the derrick may be used to handle loads from one vessel to the other. With this arrangement the derrick boom covers a large section of the hull and it is only necessary to move it a few times to cover the entire length.

I have referred in a number of places to members composed of plates. It will be understood that a single plate or a plurality of plates may generally be used interchangeably according to the strength required and that these plates may be stiffened with angles and other plates in various ways known to those skilled in the art. Also the connections between the various parts may be made in a variety of ways.

The principal function of the members 7 is to serve as a sort of false mast to take vertical components of the strains occurring at the point of connection with the gooseneck and thus to avoid the imposing of these vertical components upon the mast, the latter being free from the stiff-leg so far as any vertical transmission of strains between them is concerned. And even where the center of pressure of the horizontal bearing at the top of the mast is out of line with the connecting plate, as in Fig. 10, or where some other style of construction is adopted, as long as the stiff-leg is made of the two members which receive the horizontal strains from the goose-neck or connecting plate at their point of intersection, the vertical components or substantially all the vertical components of the strains occurring at this point will be taken by the member 7 of the back-leg. The advantage is especially apparent in derricks designed to handle the heaviest loads, since the weakness of the ordinary stiff-leg derricks, with single inclined legs extending backward from the top of the mast to the ground is more apparent as well as more dangerous in these larger sized derricks. Indeed such weaknesses have resulted generally in the adoption of rotary cranes and other very expensive styles of construction instead of a regular derrick where heavy loads have had to be lifted.

Another advantage in having the back-leg constituted practically as a truss independently of the mast is that the bearings of the mast are made readily accessible for inspection and repair. By fastening the mast at a point below this top to the stiff-leg the upper bearing may be examined or removed and replaced without danger.

Considerable vertical play is allowed in the upper bearing and the mast may be lifted and then supported at two points of its length from the member 7 of the stiff-leg, after which the three castings of the lower bearings may be withdrawn laterally (first knocking out the pins by which they are fastened to the sills.)

Though I have described with great particularity of detail certain embodiments of my invention, yet it is not to be understood therefrom that the invention is restricted to the particular embodiments disclosed. Various modifications thereof in detail and in the arrangement of the parts may be made by those skilled in the art without departing from the invention as defined in the following claims.

What I claim is:

1. A derrick having a mast and a stiff-leg, said stiff-leg comprising a post and back-legs forming a pair of members meeting at a point near the top of the mast, and a connecting member extending from such meeting point and engaging the mast.

2. A derrick having a mast, a pair of stiff-leg members meeting at a point near the top of the mast, and a connecting member between the stiff-leg and the mast connected to the latter by a bearing, said bearing being arranged to permit relative vertical movement between the stiff-leg and mast without transmission of vertical stresses therebetween.

3. A derrick having a mast, a pair of stiff-leg members meeting at a point near the top of the mast, and a connecting member between the stiff-leg and the mast connected to the latter by a bearing, said bearing being arranged to permit relative vertical movement between the stiff-leg and mast without transmission of vertical stresses therebetween, the center line of said connecting member passing through said bearing.

4. A derrick having a mast, a pair of stiff-leg members meeting at a point near the top of the mast, and a connecting member between the stiff-leg and the mast connected to the latter by a bearing, said bearing being arranged to permit relative vertical movement between the stiff-leg and mast without transmission of vertical stresses therebetween, the center line of said connecting member passing through the meeting point of said members of the stiff-leg.

5. A derrick having a mast, a pair of stiff-leg members meeting at a point near the top of the mast, and a connecting member between the stiff-leg and the mast connected to the latter by a bearing, said bearing being arranged to permit relative vertical movement between the stiff-leg and mast without transmission of vertical stresses therebetween, the center line of said connecting member passing through the meeting point of said members of the stiff-leg and passing through said bearing.

6. A derrick having a mast, a supporting structure for the upper end of the mast comprising upper and lower members, and a rotary bearing comprising a ring on said upper member and a pair of rings on the lower member, said pair of rings embracing the ring of the upper member and serving to retain a supply of oil.

7. A derrick having a stiff-leg, a rotatable mast, means forming a thrust bearing on which the lower end of said mast is rotatably supported, said means having contacting concavo-convex surfaces permitting tilting movement of said mast, and means pivotally connecting said thrust bearing to said stiff-leg.

8. A derrick having a mast and supporting means at the lower end of the mast comprising a bottom member 21 having a concave socket, an intermediate member 22 having a convex face fitting in said socket to permit tilting of the mast and a top member 19 having a rotary and thrust bearing on said intermediate member 22.

9. A derrick having a mast and supporting means at the lower end of the mast comprising an upper ring-shaped member and a lower member having a pair of rings embracing the ring of the upper member and arranged to take the rotary and thrust bearings of the latter and to receive and retain a supply of oil, said lower member being mounted to permit tilting of the mast.

10. A derrick having a rotating mast, a bearing for the lower end thereof, a stationary post and back leg forming a stiff-leg and means pivotally connecting said bearing to the lower part of said stiff-leg.

11. A derrick comprising a mast, an intermediate bearing member 22 for the lower end thereof, a derrick supporting structure and a link forming a connecting member 36 pivotally connected to said bearing member 22 and to the sill of the derrick supporting structure.

12. A derrick having a mast and a boom pivoted thereon, the lower end of said boom having jaw plates mounted on a main pivot and having also outrigger plates pivoted to parts fixed to the mast at points in line with and beyond the ends of the main pivot pin.

13. A derrick having a mast and a stiff leg connected thereto, said stiff leg comprising a vertical post in close proximity to and substantially the same height as said mast, and a back leg having its upper end connected to the post adjacent the upper end of said post.

14. A derrick having a mast and a stiff-leg constituting a heavy supporting structure, the mast being connected at its upper end to the stiff-leg with freedom of vertical movement and having bearings at the lower end which are removable on the lifting of the mast.

15. A derrick having a mast and a stiff-leg connected thereto, said stiff leg comprising a vertical post in close proximity to said mast, and a back leg having its upper end connected to the post adjacent the upper end of said post.

In witness whereof I have hereunto signed my name.

OTIS E. HOVEY.